US012596882B2

(12) United States Patent
Agrawal et al.

(10) Patent No.: US 12,596,882 B2
(45) Date of Patent: Apr. 7, 2026

(54) COMPLIANCE DETECTION USING NATURAL LANGUAGE PROCESSING

(71) Applicant: American Express Travel Related Services Company, Inc., New York, NY (US)

(72) Inventors: Ashish Kumar Agrawal, Phoenix, AZ (US); Srinivas K. Kumandan, Phoenix, AZ (US); Robin Jain, Phoenix, AZ (US); Abishek Jain, Bengaluru (IN); Yogaraj Jayaprakasam, Phoenix, AZ (US); Catherine Dzendzera, New York, NY (US); Michelle Chambless-Ferguson, Phoenix, AZ (US); Sean J. Tucker, New York, NY (US); Christopher J. Haines, Paramus, NJ (US); Jeff B. Li, Brooklyn, NY (US); Apoorva Batra, New Delhi (IN); Hector Flores, Phoenix, AZ (US); Chirag Kathuria, Scottsdale, AZ (US); Seerla Phani Praveen, Bengaluru (IN)

(73) Assignee: American Express Travel Related Services Company, Inc., New York, NY (US)

( * ) Notice: Subject to any disclaimer, the term of this patent is extended or adjusted under 35 U.S.C. 154(b) by 187 days.

(21) Appl. No.: 18/335,256

(22) Filed: Jun. 15, 2023

(65) Prior Publication Data

US 2024/0419915 A1 Dec. 19, 2024

(51) Int. Cl.
*G06F 40/35* (2020.01)
*G06F 40/279* (2020.01)
*G06Q 30/018* (2023.01)

(52) U.S. Cl.
CPC ............ *G06F 40/35* (2020.01); *G06F 40/279* (2020.01); *G06Q 30/0185* (2013.01)

(58) Field of Classification Search
CPC .... G06F 40/35; G06F 40/279; G06Q 30/0185
See application file for complete search history.

(56) References Cited

U.S. PATENT DOCUMENTS

| | | | | |
|---|---|---|---|---|
| 9,537,892 B2 * | 1/2017 | Moloian | ................. | H04L 63/20 |
| 2014/0143026 A1 * | 5/2014 | Nies | ................. | G06Q 10/06398 |
| | | | | 705/7.42 |

(Continued)

*Primary Examiner* — Athar N Pasha

(74) *Attorney, Agent, or Firm* — Thomas | Horstemeyer, LLP

(57) ABSTRACT

Disclosed are various embodiments for compliance detection using natural language processing. Various embodiments include a computing device that can transcribe a sound recording of a transcript, where the sound recording can be representative of a telephonic call occurring between an agent and a client. The computing device can determine that the telephonic call included a discussion related to a regulated subject based on an analysis by a natural language processor of the transcript. The computing device can obtain a compliance rule based at least in part on the regulated subject of the telephonic call. The computing device can determine that the compliance rule has been violated using a natural language processor of the transcript. The computing device can also store various information related to the compliance violation.

20 Claims, 3 Drawing Sheets

(56) References Cited

U.S. PATENT DOCUMENTS

| | | | |
|---|---|---|---|
| 2015/0106091 A1* | 4/2015 | Wetjen | G10L 15/26 |
| | | | 704/235 |
| 2023/0065468 A1* | 3/2023 | Lu | G10L 15/063 |
| 2023/0074189 A1* | 3/2023 | Herard | G06N 3/0455 |
| 2023/0297785 A1* | 9/2023 | Lamm | G06F 40/35 |
| | | | 704/232 |
| 2023/0350947 A1* | 11/2023 | Mckenzie-Kelly | |
| | | | G06F 16/7844 |
| 2024/0404546 A1* | 12/2024 | Bloomfield | H04M 7/0078 |

* cited by examiner

COMPLIANCE DETECTION USING NATURAL LANGUAGE PROCESSING

BACKGROUND

Laws, regulations, and industry standards often require businesses to keep recordings of phone calls for various purposes. At least one purpose is to ensure that the business is not violating any laws, regulations, or industry standards when speaking with clients or potential clients. A business can hire compliance reviewers to ensure that the calls made by agents of the business are compliant with any laws, regulations, and industry guidelines.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
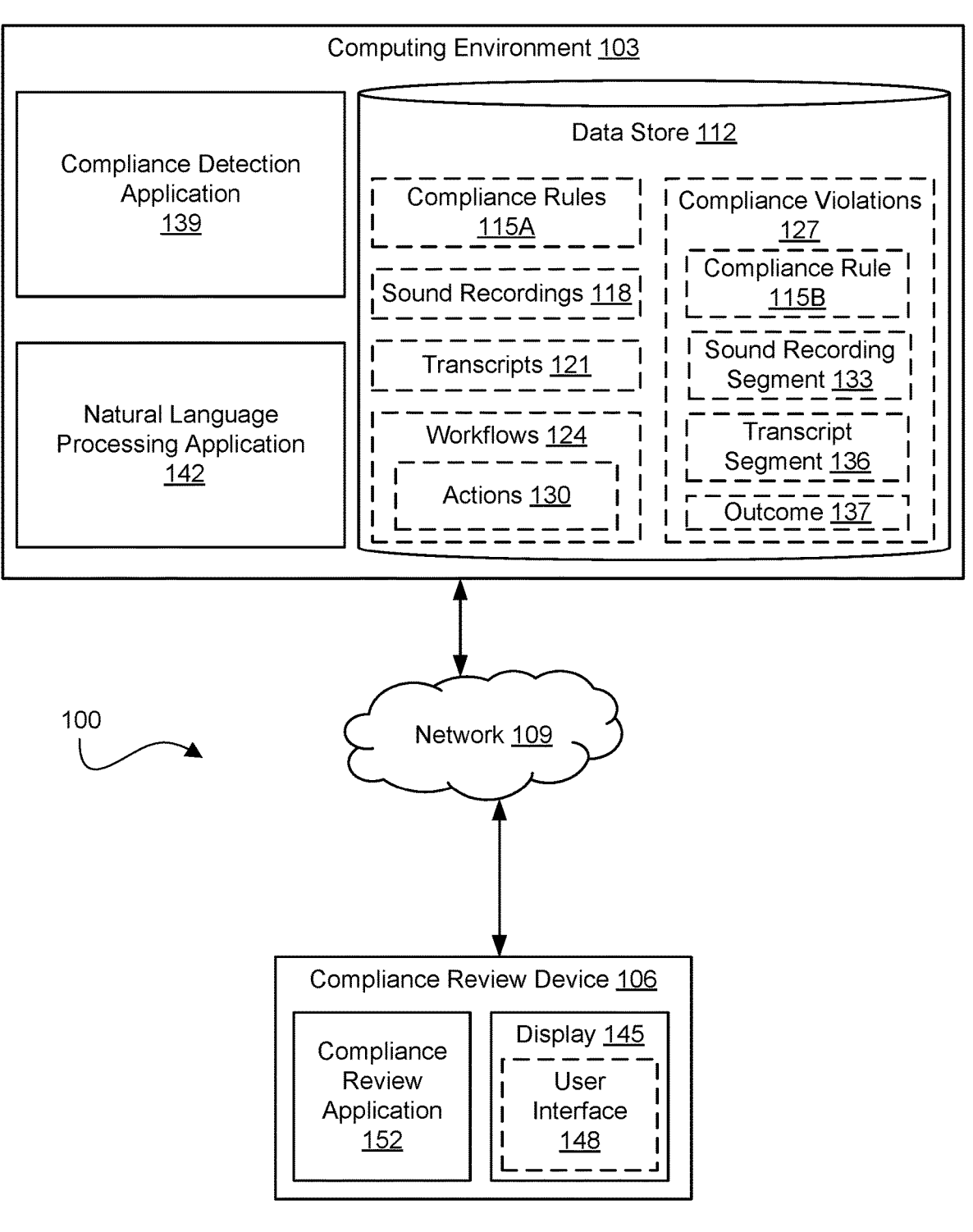
FIG. 1 is a drawing of a network environment according to various embodiments of the present disclosure.

Disclosed are various approaches for compliance detection using natural language processing. Businesses can enforce compliance rules to ensure that the business is compliant with laws, regulation, and/or industry standards. To do so, businesses hire compliance reviewers, people who evaluate actions taken by agents of the business and determine whether the action was compliant with the relevant laws, regulations, and/or industry standards. However, compliance reviewers can be limited to the number of actions they review due to the manual evaluation of each action. For example, a compliance reviewer can evaluate a phone call between an agent of the company and a client (or a prospective client). Such phone calls could be considerably long (e.g., an hour or more, etc.), so the compliance reviewer would be limited to reviewing only a few phone calls in a standard workday. Further, various laws and regulations could limit the number of work hours that a compliance reviewer can perform in a workday to ensure that the compliance reviewer stays sharp and is not overburdened. In turn, fewer calls can be reviewed in the limited workday. Accordingly, there is a need in the industry to speed up the amount of time it takes for a compliance reviewer to evaluate the action taken by an agent of the business.

In some industries, a business could perform a substantial number of actions each day. For instance, a business could receive or place hundreds of thousands of calls between an agent of the business and a client each day. Because there are so many actions that would need to be evaluated by compliance reviewers, businesses have permitted compliance reviewers to sample select actions to evaluate the compliance as a representation of a group of actions taken by each agent. In other words, the compliance reviewers cannot review every action, so only a small percentage of actions can be evaluated. This means that infractions that can occur in a non-evaluated call could be ignored by the business because it would be impossible or impractical to hire the necessary compliance reviewers to evaluate each call manually.

To solve these problems, compliance reviewers can be assisted by a compliance detection system that uses natural language processing to detect when a compliance rule might be violated and/or provide a percentage amount representing the likelihood that a compliance rule might be violated. When the compliance detection system detects that a compliance rule might be violated, a text representation of the violation, a portion of the sound recording between the agent and the client (or potential client), and a compliance rule that may have been violated can be shown to a compliance reviewer for their swift evaluation of the action taken by the agent. Using such a system, compliance reviewers can evaluate hundreds of calls in a day rather than the few calls reviewed previously.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a network environment 100 according to various embodiments. The network environment 100 can include a computing environment 103 and a compliance review device 106, which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic computing resource where the allotted capacity of processing, network, storage, or other computing-related resources can vary over time.

Various data can be stored in a data store 112 that can be accessible to the computing environment 103. The data store 112 can be representative of a plurality of data stores 112, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store 112. The data stored in the data store 112 is associated with the operation of the various applications or functional entities described below. This data can include compliance rules 115A (generically as "compliance rules 115"), sound recordings 118, transcripts 121, workflows 124, compliance violations 127, and potentially other data.

The compliance rules 115 can represent a law, regulation, rule, standard, and/or guideline that is required to be followed by agents of the business. In some industries, compliance rules 115 can be required by law or governmental regulation. For instance, utility companies (e.g., water, gas, electricity, etc.), financial institutions (e.g., banks, financial traders, lenders, etc.), governments, and other industries can be required by law to act specific ways when talking with consumers, clients, citizens, and/or people. In some situations, compliance rules 115 can be instituted by the business voluntarily. A business could institute compliance rules 115 to ensure consistency among its agents when they talk with clients. In some situations, a compliance rule 115 can represent an industry standard. In such a situation, the business is not required by law to implement the compliance rule 115, but the business implements such a compliance rule 115 to conform with the industry practices. An example of a compliance rule 115 can be that whenever an agent of the business starts a call with a client, the agent must identify that the call is being recorded. In at least some embodiments, the compliance rule 115 can include a regular expression or a word/phrase that can be matched against. In some embodiments, the compliance rule 115 can include a statement that, when provided to a natural language processing application 142, can determine whether the compliance rule 115 has been violated. In some embodiments, the natural language processing application 14 can determine a percentage amount representing the likelihood that the compliance rule 115 has been violated; this could also be described as a confidence score in the determination of compliance rule 115 violation. The compliance rule 115 can also include the language of or a citation to a specific law, regulation, or industry standard.

In at least some embodiments, a compliance rule 115 can require that a word or phrase be recited verbatim to not violate the compliance rule 115. For example, a police officer would need to recite a person's Miranda rights verbatim prior to arresting an individual suspected of a crime. In another example, an agent of the business must ask whether the client consents to receiving an email by reciting a specified script to ensure that the business does not violate the CAN-SPAM Act, which regulates how businesses can use email to communicate with people. In embodiments where an agent is required to recite a statement verbatim, the compliance rule 115 can include the exact statement that the agent must recite. In some embodiments, the compliance rule 115 can include a reference to the exact statement that the agent must recite. For example, the compliance rule 115 can include that the agent must recite the client's Miranda rights. The natural language processing application 142 can be trained to understand that certain language must be required when using the reference rather than the exact text itself.

In at least some embodiments, a compliance rule 115 can require non-verbatim statements to be made. For instance, a compliance rule 115 can require that an agent advise a client how to contact customer support regarding their questions after the call, but such an explanation does not have to be recited verbatim to the client. For such compliance rules 115 that require non-verbatim statements to be made, the natural language processing application 142 can identify portions of the conversation and characterize such portions of the conversation with the client to predict whether the compliance rule 115 has been violated. The natural language processing application 142 could also utilize intent classification on the transcript 121 and/or the sound recording 118 to identify whether the compliance rule 115 has been violated. In some embodiments, the natural language processing application 142 could also utilize intent classification on the transcript 121 and/or the sound recording 118 to determine a confidence score for whether the compliance rule 115 has been violated. Intent classification can include an analysis of the conversation, as a sound recording 118 or as a transcript 121, to determine contextual meanings behind the literal words written. For instance, the client and the agent can establish a rapport with each other such that a joke or sarcasm can be utilized in their conversation. In such a situation, the literal words used can mean something other than their traditional meaning. In another instance, the client and the agent can be locked in a tense confrontation and the client can be using hyperbole to express a reasonable feeling. In both situations, the natural language processing application 142 can identify the intent behind the specific language used and classify that language appropriately.

In some embodiments, a compliance rule 115 can require that certain statements not be misleading. For example, in a call between a client and an agent, the agent may state that an "APR" or "Annual Percentage Rate" for a credit card will be a specified percentage (e.g., five percent, ten percent, etc.). However, such a statement could be misrepresenting an offer if that specific "APR" is an introductory rate (e.g., the rate will increase after a period of time), and the agent fails to inform the client about such an increase. In some embodiments, the compliance rule 115 can require that misrepresentations were explicitly stated. In some embodiments, the compliance rule 115 can require that omissions on statements that should have been stated count as a misrepresentation to the client. Omissions can be detected by the natural language processing application 142 as a result of being trained to find complete disclosures of information to clients.

In some embodiments, a compliance rule 115 can require that certain rules be followed conditionally. For instance, when certain words or phrases are identified in the transcript 121, the compliance rule 115 would then be required to be evaluated. For instance, a compliance rule 115 could require that the word "APR" or "Annual Percentage Rate" be discussed. In such an example, when "APR" or "Annual Percentage Rate" is stated, the compliance rule 115 could then require that certain statements be stated verbatim, that certain discussions be included in a non-verbatim fashion, and/or that certain statements be misrepresented to the client, as previously discussed.

The sound recordings 118 can represent a call or a discussion between at least an agent and a client (or prospective client). For various compliance purposes, conversations or calls between an agent of the business and a client can be recorded as sound recordings 118. The sound recordings 118 can be stored as various formats that can be used for playback, such as a Waveform Audio file format (.WAV), an MPEG Audio Layer 3 file format (.MP3), a Windows® Media Audio file format (.WMA), and/or other audio file formats.

The transcripts 121 can represent a text interpretation of the call or discussion between at least an agent and a client (or prospective client). In at least some embodiments, a transcript 121 can be generated by transcribing a call or discussion from a sound recording 118. In at least another embodiment, a transcript 121 can be generated by transcribing a call or discussion as it is actively occurring. In some embodiments, emails, text messages, and/or other text content can be included in the transcript 121 such that a complete record of a discussion between an agent and client can be captured. A transcript 121 can be analyzed by a natural language processing application 142 to determine whether the call or discussion between at least the agent and the client (or prospective client) is compliant with one or more compliance rules 115. In some embodiments, the transcript 121 can be representative of just the statements that were made during the call. In some embodiments, the transcript 121 can identify one or more speakers to provide context to the flow of the discussion or call. In at least one example, the transcript 121 can have a first speaker identified as an agent. Similarly, the transcript 121 can have a second speaker identified as a client. In some embodiments, the transcript 121 can include a date and timestamp corresponding to when each statement was made. In some embodiments, the transcript 121 can include a time counter that marks the time that has elapsed since the start of the call or discussion. Although these time counters often measure in seconds, they could measure in minutes or other units of time. Such date and time features can be used to correlate the progress of the conversation with a workflow 124.

The workflows 124 can represent a process that an agent follows when conducting a call or discussion with a client. The workflow 124 can take the form of a guided list of topics, statements, or information that need to be recited or discussed with the client. In at least one embodiment, an agent of a business can follow a workflow 124 on a computing device (not depicted in FIG. 1) that directs the agent to recite that "the call is being recorded." In such an embodiment, the agent can ask for consent to obtain personal information or other information that is protected by law, regulation, or industry standard. In such an embodiment, the agent can go through each of the various steps of the workflow 124 with the client to ensure that the content of the call is complete. In at least one embodiment, the workflow 124 can include code on a computing device (not depicted in FIG. 1) that tracks the progress of the workflow 124 as it relates to each call.

The progress of the workflow 124 for each call can be stored as one or more actions 130, which could also be called an action log. The actions 130 can represent a click event, a mouse event, a keyboard event, or any other computer captured event that can be stored in relation to the call. In at least one embodiment, an action 130 can be stored in association with the call along with a date and timestamp when such action 130 has occurred. In at least another embodiment, an action 130 can be stored in association with the call along with a time which an action 130 has occurred, typically in seconds, since the call or discussion had started. One or more actions 130 (an action log) can be used to identify sections of the transcript 121. For instance, the workflow 124 can lead the agent through various discussion topics to find out the needs of the client (or the prospective client). As the agent clicks through the workflow 124, each action 130 is being stored in association with the call or discussion. The topics identified in the workflow 124 can be correlated to the actions 130 to identify portions of the transcript 121 that pertain to a specific topic. Due to the additional context of the call or discussion, likely violations of compliance rules 115 can be more accurately identified by the natural language processing application 142.

The compliance violations 127 can represent instances which a compliance detection application 139 has identified a possible violation of a compliance rule 115. The compliance violations 127 can include a compliance rule 115B, a sound recording segment 133, a transcript segment 136, and potentially other data. The compliance rule 115B is representative of a specific compliance rule 115A for which a violation has occurred. The compliance rule 115B can be represented as an identifier of a compliance rule 115A and/or a copy of the compliance rule 115A. The compliance rule 115B can take on attributes of compliance rules 115, as previously discussed.

The sound recording segment 133 can represent a portion of a sound recording 118 as it relates to a specific compliance violation 127. The sound recording segment 133 can be used by compliance reviewers to quickly listen to the relevant portion of the sound recording 118, rather than having to listen to the entirety of the sound recording 118. The sound recording segment 133 can be a portion of the sound recording 118, as previously described. The sound recording segment 133 can be stored as various formats that can be used for playback, such as a Waveform Audio file format (.WAV), an MPEG Audio Layer 3 file format (.MP3), a Windows® Media Audio file format (.WMA), and/or other audio file formats.

The transcript segment 136 can represent a portion of a transcript 121 as it relates to a specific compliance violation 127. The transcript segment 136 can be used by compliance reviewers to quickly visually review whether statements between at least the agent and the client raise to the level of violating a compliance rule 115. The transcript segment 136 can be a portion of the transcript 121, as previously described.

The outcome 137 can represent how the business chooses to resolve the identified compliance violation 127. In at least one embodiment, a compliance reviewer can determine that the compliance violation 127 was stored in error, and no response should be made as an outcome 137. In some embodiments, a compliance reviewer can determine that a response is warranted, and action could be taken to alleviate the compliance violation 127 as an outcome 137. An outcome 137 can include reporting the violation to a necessary entity (e.g., a government, an industry organization, etc.). An outcome 137 can include reprimanding or taking punitive action against the agent for their part in the compliance violation 127. An outcome 137 could also include calling the client to describe the compliance violation 127. The outcome 137 can be decided by a compliance reviewer and sent to the computing environment 103 from a compliance review device 106.

Also, various applications or other functionality can be executed in the computing environment 103. The components executed on the computing environment 103 can include a compliance detection application 139, a natural language processing application 142, and other applications, services, processes, systems, engines, or functionality not discussed in detail herein.

The compliance detection application 139 can be executed to at least transcribe a call between at least an agent and a client to generate a transcript 121. The compliance detection application 139 can transcribe a call or discussion that is currently occurring or a call or discussion that has been recorded as a sound recording 118. The compliance detection application 139 can obtain one or more actions 130 corresponding to a workflow 124 followed in association for the call. The compliance detection application 139 can then identify sections of the transcript 121 using a natural language processing application 142. The compliance detection application 139 can obtain a compliance rule 115 and send a request to the natural language processing application 142 to determine that the compliance rule 115 has been violated and/or determine a confidence score for the likelihood that the compliance rule 115 has been violated. The compliance detection application 139 can then store a compliance violation 127 into a data store 112. The compliance detection application 139 can generate a user interface 148 for a compliance review device 106 and subsequently receive an outcome 137 for the compliance violation 127 from the compliance review device 106. The compliance detection application 139 can then store the outcome 137 in association with the compliance violation 127. Additional information regarding the compliance detection application 139 is further described in the discussion of FIG. 3.

The natural language processing application 142 can be executed to identify contextual nuances in the text of a transcript 121 and/or a sound recording 118. The natural language processing application 142 can be trained using various transcripts 121 of historical calls and their corresponding compliance violations 127. The natural language processing application 142 can use various techniques to identify and analyze the transcripts 121, such as syntactical analysis, lexical semantic analysis, relational semantic analysis, discourse and intent analysis, summarization, and other types of natural language processing analysis. The natural language processing application 142 can receive a request from the compliance detection application 139 to analyze a transcript 121 and/or identify a violation of a compliance rule 115 within a transcript 121. The natural language processing application 142 can analyze the transcript 121 to separate portions of the text into different categories or topics. The natural language processing application 142 can also receive a compliance rule 115 and a transcript 121 to subsequently identify a transcript segment 136 within the transcript 121 that likely violates the compliance rule 115. The natural language processing application 142 can identify what qualifies as a violation of the compliance rule 115 based on a regular expression or based on a natural language description of the rule, as previously discussed. The natural language processing application 142 can determine a confidence score for the likelihood that a compliance rule 115 has been violated. A confidence score can be some numeric value or combination of one or more numeric values. For example, a percentage or a decimal can be used to represent a confidence score. In at least another example, an integer value can count the number of times that the compliance rule 115 is likely violated, thus representing a value that increases the confidence that the value has been violated.

The compliance review device 106 can represent a plurality of client devices that can be coupled to the network 109. The compliance review device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The compliance review device 106 can include one or more displays 145, such as liquid crystal displays (LCDs), gas plasma-based flat panel displays, organic light emitting diode (OLED) displays, electrophoretic ink ("E-ink") displays, projectors, or other types of display devices. In some instances, the display 145 can be a component of the compliance review device 106 or can be connected to the compliance review device 106 through a wired or wireless connection.

The compliance review device 106 can be configured to execute various applications, such as a compliance review application 152 or other applications. The compliance review application 152 can be executed in a compliance review device 106 to access network content served up by the computing environment 103 or other servers, thereby rendering a user interface 148 on the display 145. To this end, the compliance review application 152 can include a browser, a dedicated application, or another executable, and the user interface 148 can include a network page, an application screen, or another user mechanism for obtaining user input. User input can include the outcome 137 of a compliance violation 127. The compliance review device 106 can be configured to execute applications beyond the compliance review application 152, such as email applications, social networking applications, word processors, spreadsheets, or other applications.

Next, a general description of the operation of the various components of the network environment 100 is provided. To begin, the compliance detection application 139 can be executed to at least transcribe a call between at least an agent and a client to generate a transcript 121. The compliance detection application 139 can transcribe a call or discussion that is currently occurring or a call or discussion that has been recorded as a sound recording 118. The compliance detection application 139 can obtain one or more actions 130 corresponding to a workflow 124 followed in association for the call. The compliance detection application 139 can then identify sections of the transcript 121 using a natural language processing application 142. The compliance detection application 139 can obtain a compliance rule 115 and send a request to the natural language processing application 142 to determine that the compliance rule 115 has been violated and/or determine a confidence score for the likelihood that the compliance rule 115 has been violated. The compliance detection application 139 can then store a compliance violation 127 in a data store 112. The compliance detection application 139 can generate a user interface 148 for a compliance review device 106. The compliance review application 152 can receive the user interface 148 generated by the compliance detection application 139 and render the user interface 148 on the display 145. The user interface 148 can display one or more compliance violations 127 and the user interface 148 can be configured to prompt a compliance reviewer to enter an outcome 137 for the compliance violation 127. The compliance detection application 139 can subsequently receive an outcome 137 for the compliance violation 127 from the compliance review device 106. The compliance detection application 139 can then store the outcome 137 in association with the compliance violation 127. Additional information regarding the compliance detection application 139 is further described in the discussion of FIG. 3.

Figure 2:
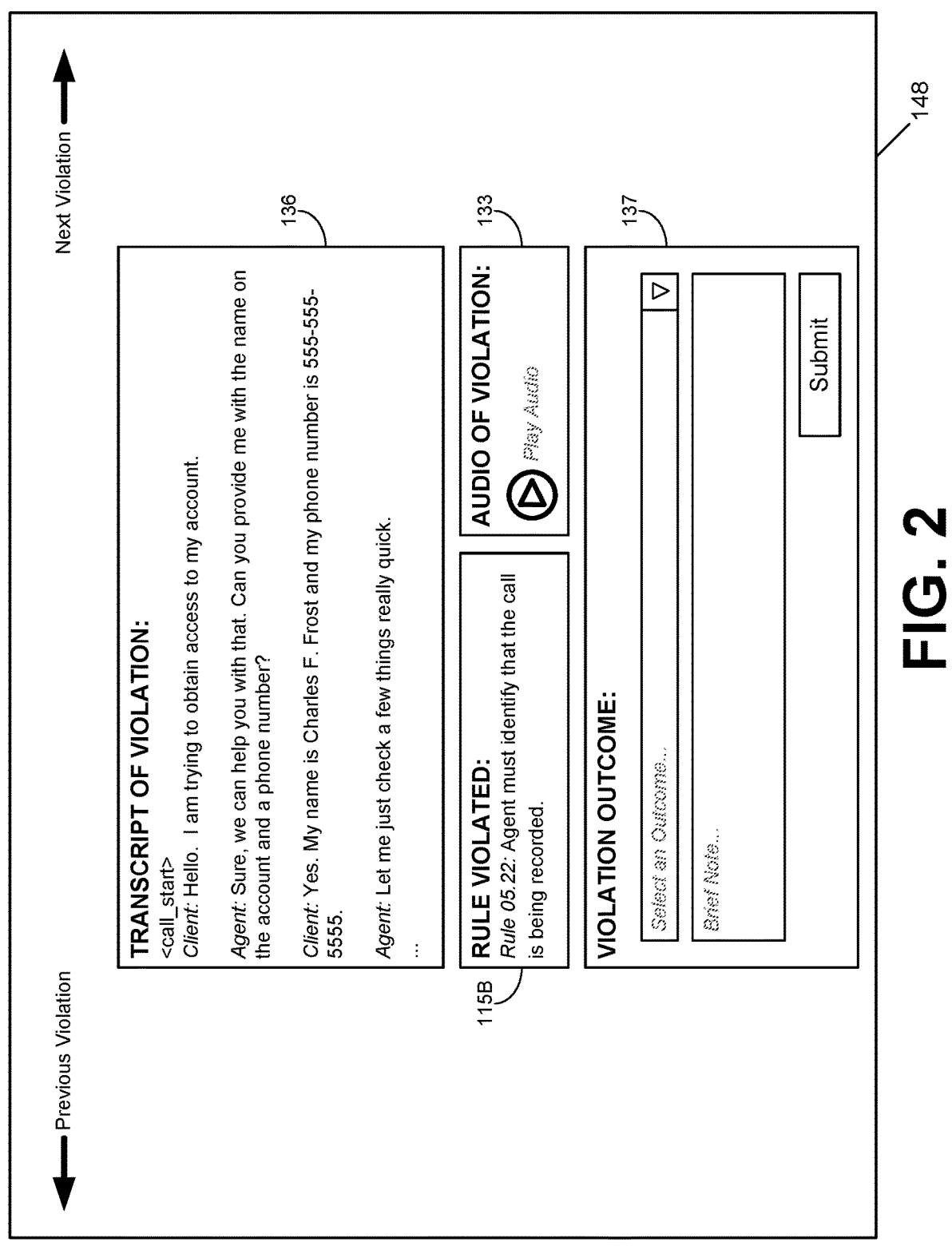
FIG. 2 is a pictorial diagram of an example user interface rendered by a client in the network environment of FIG. 1 according to various embodiments of the present disclosure.

Referring next to FIG. 2, shown is a pictorial diagram of an example user interface 148 rendered by a compliance review device 106 in the network environment 100 of FIG. 1 according to various embodiments of the present disclosure. The user interface 148 can include a transcript segment 136, a compliance rule 115B that was violated, a sound recording segment 133, and a prompt to obtain an outcome 137. In at least some embodiments, the user interface 148 can include a confidence score relating to the likelihood that the compliance rule 115B was violated. The transcript segment 136 can include an identifier that represents the portion of the call that is being displayed. For example, in FIG. 2, there is the identifier "<call_start>" to identify that this is the beginning of the call between the client and agent. The identifiers could be a date, timestamp, or time since the start of the call identifier. Below the identifier in the transcript segment 136 are various statements that begin with either "Client" or "Agent" to identify the speaker of the statement. The transcript segment 136 ends in FIG. 2 with an ellipsis (" . . . ") to denote that the call continues further after this transcript segment 136. Various other identifiers can be used to identify the start or end of the call.

The user interface 148 can include the compliance rule 115B that was violated for the compliance violation 127. In FIG. 2, the compliance rule 115B is depicted as "Rule 05.22: Agent must identify that the call is being recorded." The user interface 148 can also include the sound recording segment 133. Specifically, the user interface 148 can provide an affordance, such as a play button or a download link, which makes it possible for a compliance reviewer to hear the relevant portion of the sound recording 118.

Finally, the user interface 148 can include a prompt for the compliance reviewer to enter an outcome 137. The prompt can include a dropdown element that provides a list of predefined outcomes as previously discussed. Additionally, the prompt can include a free text entry section for the compliance reviewer to enter a brief note about the outcome 137 for the compliance violation 127. The prompt can then be submitted by clicking on the submit button or by using any standard form submission actions.

Figure 3:
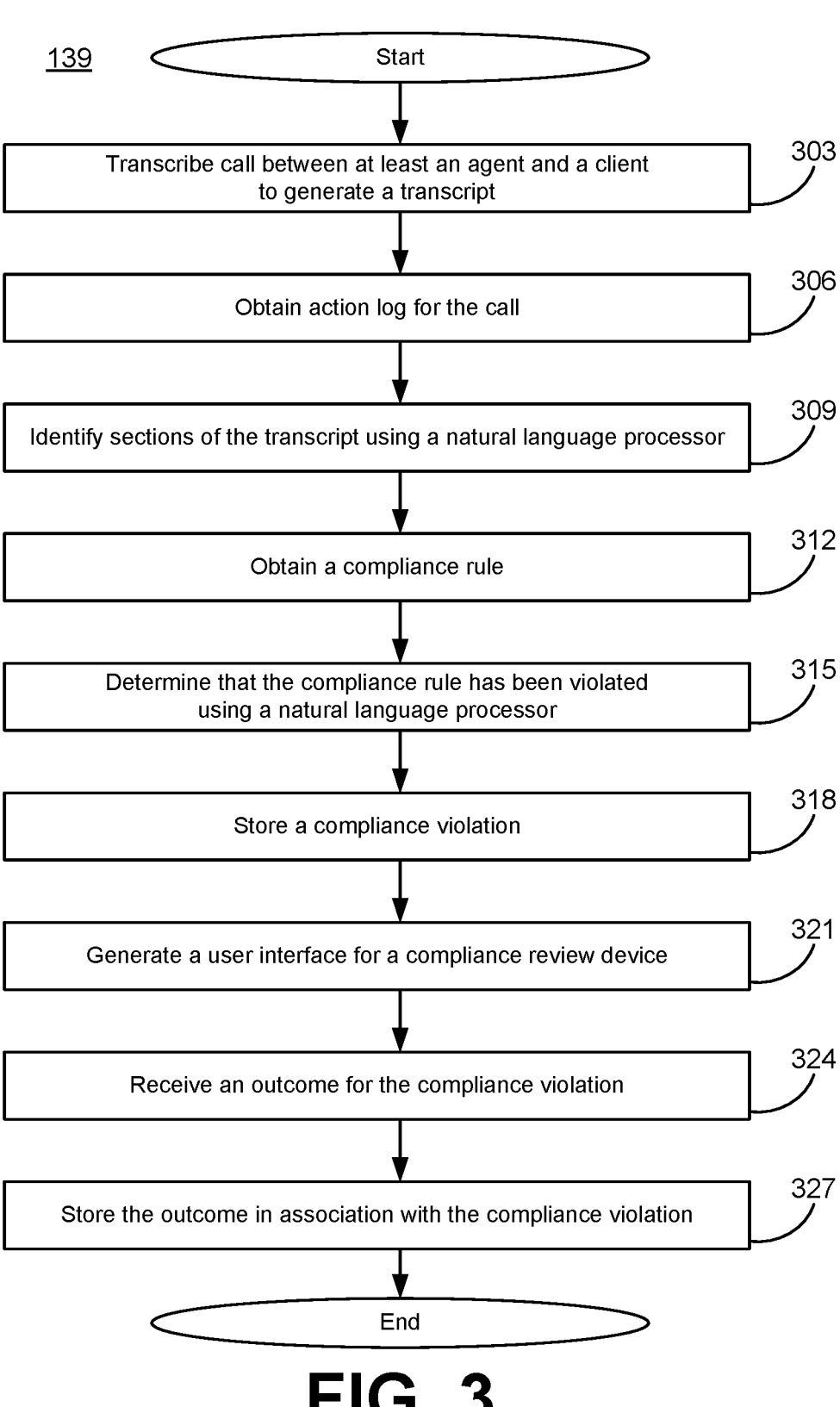
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the compliance detection application 139. The flowchart of FIG. 3 provides merely an example of the many different types of functional arrangements that can be employed to implement the operation of the depicted portion of the compliance detection application 139. As an alternative, the flowchart of FIG. 3 can be viewed as depicting an example of elements of a method implemented within the network environment 100.

Beginning with block 303, the compliance detection application 139 can transcribe a call between at least an agent and a client to generate a transcript 121. The transcripts 121 can represent a text interpretation of the call or discussion between at least an agent and a client (or prospective client). In at least some embodiments, a transcript 121 can be generated by transcribing a call or discussion from a sound recording 118 of a call or discussion. In at least another embodiment, a transcript 121 can be generated by transcribing a call or discussion as it is actively occurring. In some embodiments, the compliance detection application 139 generate raw conversation text using a speech-to-text engine and subsequently provide additional context to the raw conversation text, such as identifying speakers or including timestamps. In some embodiments, emails, text messages, and/or other text content can be included in the transcript 121 such that a complete record of a call or discussion between an agent and client can be captured. In some embodiments, the compliance detection application 139 can identify one or more speakers in the call or discussion within the transcript 121 to provide context to the flow of the discussion or call. In at least one example, the transcript 121 can have a first speaker identified as an agent. Similarly, the transcript 121 can have a second speaker identified as a client. In some embodiments, the transcript 121 can include a date and timestamp corresponding to when each statement was made. In some embodiments, the transcript 121 can include a time counter that measures an amount of time that has elapsed since the start of the call or discussion (e.g., the number of seconds, minutes, and/or hours since the start of the call or discussion).

Next, at block 306, the compliance detection application 139 can obtain one or more actions 130 (also called an action log) that are associated with the call. The action log can represent various events captured during the call. In various embodiments, the action log can include time stamps that correspond to a point in the call where a specific action 130 was taken.

Continuing to block 309, the compliance detection application 139 can identify sections of the transcript 121. In at least one embodiment, the compliance detection application 139 can identify various sections based at least in part on the action log received at block 306. In such an embodiment, the denotation that an action 130 had occurred can identify that the agent has moved from one topic to another topic, which provides a point in time, which can be identified in the sound recording 118 and the transcript 121, that separates various topics. In some embodiments, the compliance detection application 139 can provide the transcript 121 to a natural language processing application 142 to identify various categories of discussion and the points in the transcript 121 where those discussions occurred. By splitting up the transcript into smaller segments, the natural language processing application 142 can potentially provide better results regarding whether a compliance rule 115 has been violated.

Next, at block 312, the compliance detection application 139 can obtain a compliance rule 115. In at least one embodiment, the compliance detection application 139 can obtain one or more compliance rules 115 to evaluate against the entire transcript 121. In at least some embodiments, the compliance detection application 139 can obtain the compliance rules 115 based on one or more topics of discussion or categories that were identified at block 309. Various compliance rules 115 can be obtained for each transcript 121.

Continuing to block 315, the compliance detection application 139 can determine that the compliance rule 115 has been violated. In at least one embodiment, the compliance detection application 139 can send a request to the natural language processing application 142 to evaluate the transcript 121 or a portion of the transcript 121 along with a compliance rule 115 to determine whether the compliance rule 115 has been violated. In at least another embodiment, the natural language processing application 142 can provide a confidence score that represents the likelihood of the compliance rule 115 being violated. The compliance detection application 139 can include a threshold amount to compare to the confidence score. The compliance detection application 139 can then compare the confidence score to the threshold amount to determine whether the compliance rule 115 has been violated.

In at least some embodiments, a compliance detection application 139 can determine whether a compliance rule 115 is violated by not reciting a word or phrase verbatim. In another example, an agent of the business must ask whether the client consents to receiving an email by reciting a specified script to ensure that the business does not violate the CAN-SPAM Act, which regulates how businesses can use email to communicate with people. In embodiments where an agent is required to recite a statement verbatim, the compliance rule 115 can include the exact statement that the agent must recite. In some embodiments, the compliance rule 115 can include a reference to the exact statement that the agent must recite rather than the exact statement itself. For example, the compliance rule 115 can include that the agent must recite the client's Miranda rights. The natural language processing application 142 can be trained to understand that certain language must be required when using the reference rather than the exact text itself.

In at least some embodiments, a compliance detection application 139 can determine whether a compliance rule 115 is violated when the compliance rule is contextual (non-verbatim). For instance, a compliance rule 115 can require that an agent advised a client how to contact customer support regarding their questions after the call, but such an explanation does not have to be recited verbatim to the client. For such compliance rules 115 that require non-verbatim statements to be made, the natural language processing application 142 can identify and characterize the conversation with the client to predict whether the compliance rule 115 has been violated. The natural language processing application 142 could also utilize intent classification on the transcript 121 to identify whether the compliance rule 115 has been violated.

In some embodiments, a compliance detection application 139 can determine whether a compliance rule 115 is violated when a statement is misleading. For example, in a call between a client and an agent, the agent may state that an "APR" or "Annual Percentage Rate" for a credit card will be a specified percentage (e.g., five percent, ten percent, etc.). However, such a statement could be misrepresenting an offer if that specific "APR" is an introductory rate (e.g., the rate will increase after a period of time), and the agent fails to inform the client about such an increase. In some embodiments, the compliance rule 115 can require that misrepresentations were explicitly stated. In some embodiments, the compliance rule 115 can require that omissions on statements that should have been stated count as a misrepresentation to the client. Omissions can be detected by the natural language processing application 142 as a result of being trained to find complete disclosures of information to clients.

In some embodiments, a compliance detection application 139 can determine whether a compliance rule 115 is violated when the compliance rule 115 contains as condition. For instance, when certain words or phrases are identified in the transcript 121, the compliance rule 115 would then be required to be evaluated. For instance, a compliance rule 115 could require a condition that the word "APR" or "Annual Percentage Rate" be discussed. In such an example, when "APR" or "Annual Percentage Rate" is stated, the compliance rule 115 could then require that certain statements be stated verbatim, that certain discussions be included in a non-verbatim fashion, and/or that certain statements be not misrepresented to the client, as previously discussed.

Next, at block 318, the compliance detection application 139 can store a compliance violation 127 into a data store 112. Once the compliance detection application 139 determines that a violation has occurred and/or that it is more likely to have occurred than not to have occurred by comparing the confidence score to the threshold amount, the compliance detection application 139 can store the relevant portions of the transcript 121, sound recordings 118 and compliance rules 115 as a compliance violation 127 in the data store 112. In at least some embodiments, the compliance detection application 139 can trim the transcript 121 to a transcript segment 136 of the relevant portion of the violation. Similarly, the compliance detection application 139 can trim, splice, or cut the sound recording 118 to a sound recording segment 133 of the relevant portion of the violation. The compliance detection application 139 can also store a copy of the compliance rule 115 or an identifier of the compliance rule in the compliance violation 127.

Continuing to block 321, the compliance detection application 139 can generate a user interface 148 for a compliance review device 106. An example of a user interface 148 that can be generated by the compliance detection application 139 is provided in FIG. 2. The user interface 148 can be configured to at least display the compliance violation 127, meaning that it can display the compliance rule 115B that is violated, display a transcript segment 136, and/or display an affordance to play either the sound recording 118 or the sound recording segment 133. In some embodiments, the user interface 148 can also be configured to prompt the compliance review device 106 to provide an outcome 137 for the compliance violation. Some embodiments the user interface 148 can be configured to prompt the compliance review device 106 to provide the outcome 137 via a predefined list of compliance violation outcomes, such as through a dropdown selector. In some embodiments, the user interface 148 can be configured to prompt the compliance review device 106 to provide the outcome 137 via a text entry form. Various form controls can be used to obtain information about the outcome 137.

Next, at block 324, the compliance detection application 139 can receive an outcome 137 for the compliance violation 127 from the compliance review device 106. And finally at block 327, the compliance detection application 139 can store the outcome 137 in association with the compliance violation 127. Accordingly, the process depicted in the flowchart of FIG. 3 can come to an end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart shows the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowchart shows a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowchart can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory; and machine-readable instructions stored in the memory that, when executed by the processor, cause the computing device to at least:

transcribe a conversation to a transcript, the conversation being representative of a sound recording that occurs between at least an agent and a client;

obtain an action log that corresponds to the conversation, the action log identifying times in the conversation that relate to actions in a workflow, wherein the actions represent one or more click events, one or more mouse events, one or more keyboard events, one or more computer captured events, or a combination of any thereof;

identify a section of the transcript based at least in part on the action log, wherein the section of the transcript is associated with one or more topics of discussion corresponding to the workflow and based at least in part on one or more actions taken during the section of the transcript, wherein the one or more actions represent the one or more click events, the one or more mouse events, the one or more keyboard events, the one or more computer captured events, or a combination of any thereof;

obtain a compliance rule for the section of the transcript, wherein the compliance rule is based at least in part on the one or more topics of discussion associated with the section of the transcript;

determine, using a natural language processor, that the compliance rule has been violated for the section of the transcript; and store a compliance violation comprising the compliance rule and the section of the transcript.

2. The system of claim 1, wherein the machine-readable instructions that transcribe the conversation further cause the computing device to at least:

process the conversation using a speech-to-text engine as conversation text;

identify a first speaker in the conversation as the agent;

identify a second speaker in the conversation as the client; and correlate at least a portion of the conversation text with the first speaker or the second speaker to generate the transcript.

3. The system of claim 1, wherein:

at least one of the topics of discussion in the workflow comprises a recitation of a legal disclosure; and the compliance rule requires that the legal disclosure be recited verbatim within the section of the transcript.

4. The system of claim 1, wherein:

at least one of the topics of discussion in the workflow comprises a discussion of collecting personal information; and the compliance rule requires, within the section of the transcript, that the agent obtains consent to collect the personal information.

5. The system of claim 1, wherein:

at least one of the topics of discussion in the workflow includes a discussion of a client offer; and the compliance rule requires, within the section of the transcript, that the agent not misrepresent the client offer to the client.

6. The system of claim 1, wherein the machine-readable instructions further cause the computing device, when executed by the processor, to at least:

generate a user interface for a compliance review device, the user interface being configured to at least:

display the compliance violation; and prompt the compliance review device for an outcome for the compliance violation;

receive the outcome for the compliance violation; and store the outcome in association with the compliance violation.

7. The system of claim 6, wherein the compliance review device is prompted to provide the outcome for the compliance violation from a predefined list of compliance violation outcomes.

8. A method, comprising:

transcribing a conversation to a transcript, the conversation being representative of a sound recording that occurs between at least an agent and a client;

obtaining an action log that corresponds to the conversation, the action log identifying times in the conversation that relate to actions in a workflow;

identifying a section of the transcript based at least in part on the action log, wherein the section of the transcript is associated with one or more topics of discussion corresponding to the workflow and based at least in part on one or more actions taken during the section of the transcript, wherein the one or more actions represent a click event, a mouse event, a keyboard event, or other computer captured event;

obtaining a compliance rule for the section of the transcript, wherein the compliance rule is based at least in part on the one or more topics of discussion associated with the section of the transcript;

determining, using a natural language processor, that the compliance rule has been violated for the section of the transcript; and storing a compliance violation comprising the compliance rule and the section of the transcript.

9. The method of claim 8, wherein transcribing the conversation further comprises:

processing the conversation using a speech-to-text engine as conversation text;

identifying a first speaker in the conversation as the agent;

identifying a second speaker in the conversation as the client; and correlating at least a portion of the conversation text with the first speaker or the second speaker to generate the transcript.

10. The method of claim 8, wherein:

at least one of the topics of discussion in the workflow comprises a recitation of a legal disclosure; and the compliance rule requires that the legal disclosure be recited verbatim within the section of the transcript.

11. The method of claim 8, wherein:

at least one of the topics of discussion in the workflow comprises a discussion of collecting personal information; and the compliance rule requires, within the section of the transcript, that the agent obtains consent to collect the personal information.

12. The method of claim 8, wherein:

at least one of the topics of discussion in the workflow includes a discussion of a client offer; and the compliance rule requires, within the section of the transcript, that the agent not misrepresent the client offer to the client.

13. The method of claim 8, further comprising:

generating a user interface for a compliance review device, the user interface being configured to at least: displaying the compliance violation; and prompting the compliance review device for an outcome for the compliance violation;

receiving the outcome for the compliance violation; and storing the outcome in association with the compliance violation.

14. The method of claim 13, wherein the compliance review device is prompted to provide the outcome for the compliance violation from a predefined list of compliance violation outcomes.

15. A system, comprising:

a computing device comprising a processor and a memory; and machine-readable instructions stored in the memory that, when executed by the processor, cause the computing device to at least:

transcribe a sound recording to a transcript, the sound recording being representative of a telephonic call occurring between at least an agent and a client;

determine, based at least in part on an analysis by a natural language processor of the transcript, that the telephonic call included a discussion related to a regulated subject;

obtain an action log that corresponds to the telephonic call, the action log identifying times in the telephonic call that relate to one or more actions, wherein the one or more actions represent one or more click events, one or more mouse events, one or more keyboard events, one or more computer captured events, or a combination of any thereof;

obtain a compliance rule based at least in part on the regulated subject;

determine, using the natural language processor of the transcript, that the compliance rule has been violated; and store at least the compliance rule that has been violated and a portion of the transcript that is representative of the compliance rule that has been violated, wherein the portion of the transcript is based at least in part on one or more actions taken during the portion of the transcript, wherein the one or more actions represent the one or more click events, the one or more mouse events, the one or more keyboard events, the one or more computer captured events, or a combination of any thereof.

16. The system of claim 15, wherein the machine-readable instructions that store at least the compliance rule that has been violated and the portion of the transcript that is representative of the compliance rule that has been violated, when executed by the processor, further causes the computing device to at least store at least a portion of the sound recording that is representative of the compliance rule that has been violated.

17. The system of claim 15, wherein the machine-readable instructions further cause the computing device, when executed by the processor, to at least:

generate a user interface for a compliance review device, the user interface being configured to at least:

display at least the compliance rule that has been violated;

display at least the portion of the transcript that is representative of the compliance rule that has been violated; and display at least an affordance to play a portion of the sound recording that is representative of the compliance rule that has been violated.

18. The system of claim 17, wherein the user interface is further configured to at least prompt the compliance review device for an outcome for the compliance rule that has been violated and the machine-readable instructions further cause the computing device, when executed by the processor, to at least:

receive the outcome for the compliance rule that has been violated; and store the outcome in association with the portion of the transcript that is representative of the compliance rule that has been violated.

19. The system of claim 15, wherein the machine-readable instructions that transcribe the sound recording further cause the computing device to at least:

process the sound recording using a speech-to-text engine to generate raw transcription text;

identify a first speaker in the sound recording as the agent; and correlate at least a portion of the raw transcription text with the first speaker to generate the transcript.

20. The system of claim 15, wherein:

the machine-readable instructions further cause the computing device, when executed by the processor, to at least obtain an action log; and the machine-readable instructions that obtain the compliance rule based at least in part on the regulated subject further cause the computing device, when executed by the processor, to at least obtain the compliance rule based at least in part on the action log.

* * * * *